United States Patent [19]
Zahnen et al.

[11] Patent Number: 5,642,274
[45] Date of Patent: Jun. 24, 1997

[54] LOW NOISE SINUSOIDAL CONTROLLER FOR PULSE WIDTH MODULATED CONVERTERS

[75] Inventors: Joseph G. Zahnen, Knoxville; William S. Burdick, Strawberry Plain, both of Tenn.; Daniel Kustera, Franklin Square, N.Y.; Dhaval B. Dalal, Nashua, N.H.; Rui Liu, Croton-On-Hudson; Paulo Caldeira, Scarsdale, both of N.Y.

[73] Assignee: U.S. Philips Corporation, New York, N.Y.

[21] Appl. No.: 280,747

[22] Filed: Jul. 26, 1994

[51] Int. Cl.$^6$ .................................................. H02M 3/335
[52] U.S. Cl. ............................................................. 363/95
[58] Field of Search ............................ 323/272, 282, 323/285, 286; 363/16, 20, 21, 97, 22, 98

[56] References Cited

U.S. PATENT DOCUMENTS 5,321,348   6/1994   Vinciarelli et al. .................... 323/222

FOREIGN PATENT DOCUMENTS 5168246A   7/1993   Japan ............................. H02M 7/48

Primary Examiner—Aditya Krishnan
Attorney, Agent, or Firm—Edward W. Goodman

[57] ABSTRACT

A controller for supplying a switching signal to a switched mode power supply, includes a sinusoidal-like wave generator, and circuitry for selectively shifting a dc level in the sinusoidal-like wave whereby a duty cycle of the sinusoidal-like wave at a predetermined threshold level, corresponding to a turn-on level of a power switch in the switched mode power supply, is effectively controlled.

6 Claims, 3 Drawing Sheets

LOW NOISE SINUSOIDAL CONTROLLER FOR PULSE WIDTH MODULATED CONVERTERS

BACKGROUND OF THE INVENTION

1. Field of The Invention

The subject invention relates to a controller for supplying a switching signal to a switched mode power supply.

2. Description of The Related Art

Switched mode power supplies are extensively used in applications where efficient and compact power conversion is required. While there are many topologies and implementations of switched mode power supplies, all variations have square-wave signals for driving the power switches. These square-wave signals are normally generated by a pulse-width modulation controller and amplified by a buffer/driver which interfaces with the gate/base of the power switches. Low complexity, ease of implementation, well-understood operation and commercial availability of components have made square-wave control the de-facto standard in switched mode power supply applications.

FIG. 1 shows a block diagram of a flyback switched mode power supply widely used in television receiver power supply applications and indicates the square-wave control and drive as functional blocks.

It has been identified that the square-wave control is a major contributor of radiated EMI noise in the television receiver power supply. This can be explained in terms of sharp di/dt and dv/dt transitions caused by the square-wave control, The parasitic elements in the drive circuit are excited during transitions and create high frequency ringings which compound the EMI problem. The net effect is that the contribution of the control circuit to the radiated EMI signals is significant. This can result in noise visible on the display screen of the television receiver during reception of low level signals.

In order to minimize this noise, most other approaches use power stage elements (such as snubber, resonant techniques, etc.) to try and reduce the noise. However, they do not have any impact on the drive circuit transitions which contribute significantly to the noise generation. The only other known possible approach to reduce the noise contribution is to introduce RDC damping circuits (also know as gate slow-down approaches) in the drive path. While these circuits have low complexity, they have limited effectiveness due to two reasons. First, they still do not eliminate fast transitions (sharp edges) in the control circuit. Second, they add significant dissipation in the power device when the damping level is increased.

SUMMARY OF THE INVENTION

It is an object of the present invention to provide a controller for a switched mode power supply which minimizes the amount of EMI generated.

It is a further object of the subject invention to provide a controller for a switched mode power supply which is more efficient at reducing EMI than prior art controllers.

The above objects are achieved in a controller for supplying a switching signal to a switched mode power supply, characterized in that said controller comprises means for generating a sinusoidal-like wave, and means for selectively shifting a dc level in said sinusoidal-like wave whereby a duty cycle of said sinusoidal-like wave at a predetermined threshold level, corresponding to a turn-on level of a power switch in said switched mode power supply, is effectively controlled.

Applicants have found that if the square-wave controller is replaced by a sinusoidal controller operating at the same switching frequency, the di/dt and dv/dt transitions can be minimized.

Due to the lack of the square-wave waveforms in the controller, parasitic ringings are absent in the circuit. Additionally, a sinusoidal-like waveform applied to the gate of a MOSFET acting as the power switch in the switched mode power supply, results in slow turn-on and turn-off of the device, which further reduces parasitic ringings associated with the switching. It can be shown that with sinusoidal-like waveforms, the controlled slow-down can be optimally achieved without excessive power dissipation.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
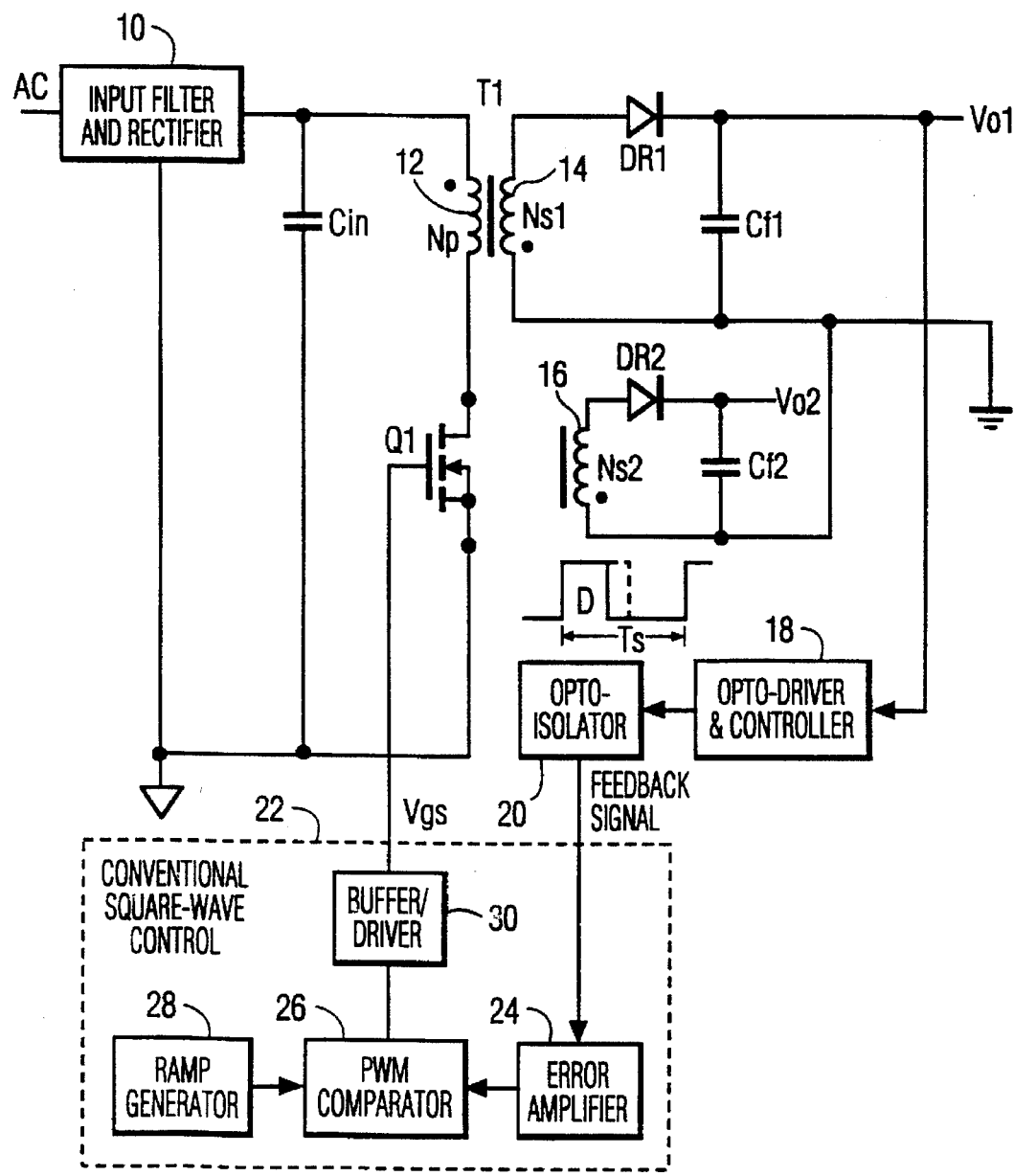
FIG. 1 is a block diagram of a switched mode power supply with a conventional square-wave controller.

FIG. 1 shows a switched mode power supply of the flyback type having a conventional square-wave controller. An input ac signal is applied to an input filter/rectifier circuit 10 having a connection to ground and an output coupled to one end of the primary winding 12 of a transformer T1. The other end of the primary winding 12 is connected through the source/drain junction of MOSFET Q1 to ground.

The transformer T1 further includes a first secondary winding 14 having the series arrangement of an output diode DR1 and a capacitor Cf1 connecting the ends of the first secondary winding 14. A first output voltage VO1 is taken from the junction of the diode DR1 and the capacitor Cf1 while the opposite end of the capacitor Cf1 is connected to ground. Similarly, the transformer T1 is shown having a second secondary winding 16 with a similarly arranged diode DR2 and capacitor Cf2, and generation a second output voltage VO2.

While not shown in the drawing, the first output voltage VO1 is regulated and is used for generating a control signal for the controller. In particular, the first output voltage VO1 is applied to an opto-driver and controller 18 which applies an output signal to an opto-isolator 20. The output signal from the opto-isolator 20 is applied as a feedback signal to the square-wave controller 22.

The square-wave controller includes an error amplifier 24 for receiving the output signal from the opto-isolator 20. An output from the error amplifier 24 is applied to a first input of a PWM comparator 26. A second input of the PWM comparator 26 receives the output signal from a ramp signal generator 28. The output from the PWM comparator 26 is applied to a buffer/driver circuit 30, the output of this buffer/driver circuit 30 forming the output of the square-wave controller 22 which is applied to a gate of the MOSFET Q1.

Figure 2:
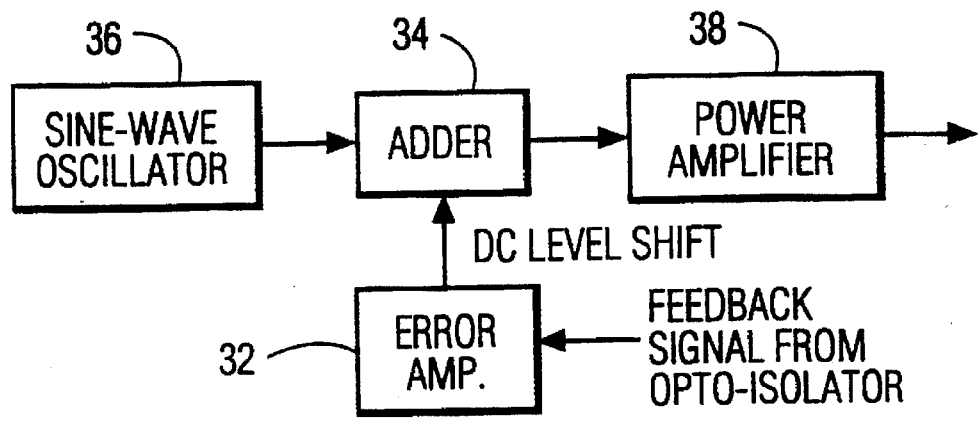
FIG. 2 is a simplified block diagram of the sinusoidal pulse width modulated drive controller of the subject invention.

FIG. 2 shows a simplified block diagram of the controller of the subject invention. In particular, as with the square-wave controller 22, the output from the opto-isolator 20 is applied to an error amplifier 32 which forms a corresponding dc level shift signal. The output from the error amplifier 32 is applied to one input of an adder circuit 34. The other input of the adder circuit 34 receives a sinusoidal-like waveform from a sine-wave oscillator 36. The output from the adder circuit 34 is applied to a power amplifier 38 so as to provide the necessary drive capabilities. The output from this power amplifier 38, constituting the output of the controller, is applied to the gate of the MOSFET T1.

Figure 3:
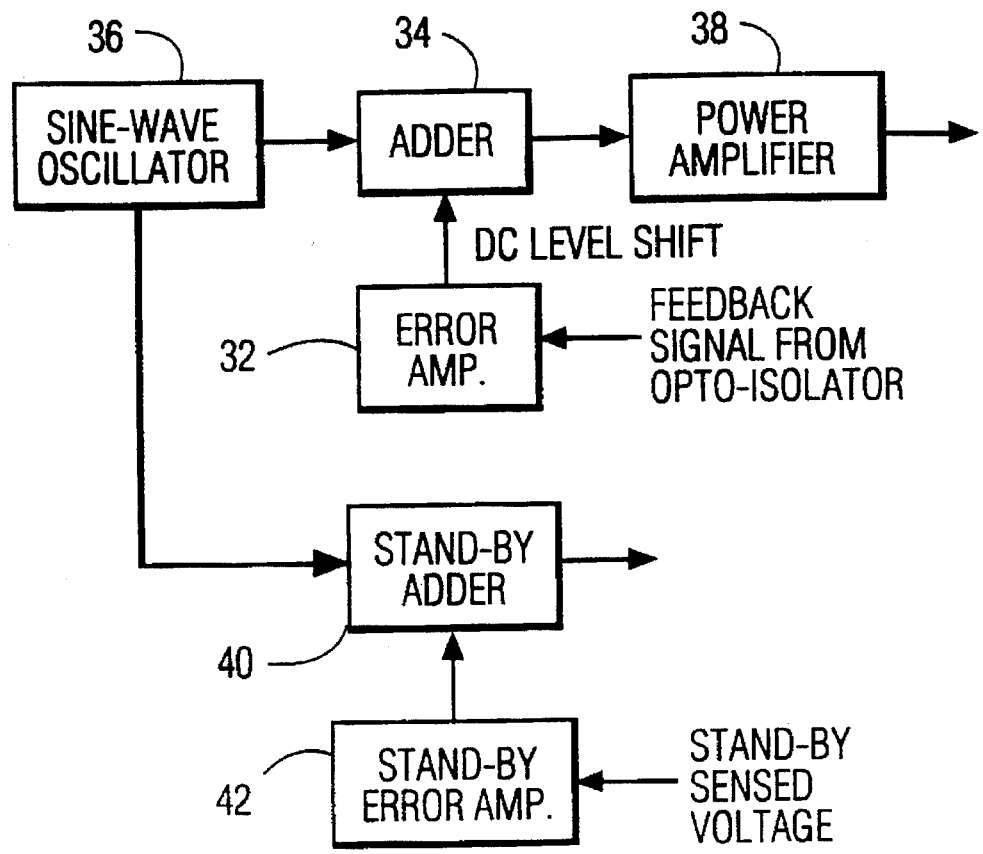
FIG. 3 is a simplified block diagram of the controller of FIG. 2 with an additional stand-by control circuit.

The above description provides a controller for achieving a sinusoidal-like drive signal for pulse width modulation control. One direct extension of the above is a controller which generates drive waveforms for more than one switch operating at the same frequency. In such a case, the same oscillator may be used with different adder circuits to create the different drive waveforms. As a result, the invention may make use of a stand-by controller in addition to the main controller as shown in FIG. 3. In particular, a second output from the sine-wave oscillator 36 is applied to a stand-by adder 40 which also receives the output from a stand-by error amplifier 42. The stand-by error amplifier 42 receives as an input the stand-by sensed voltage from the stand-by power supply (not shown). The output from the stand-by adder 40 is then used to control the stand-by power supply in the same manner as the output from the adder 34 and power supply 38 controls the switched mode power supply.

Figure 4:
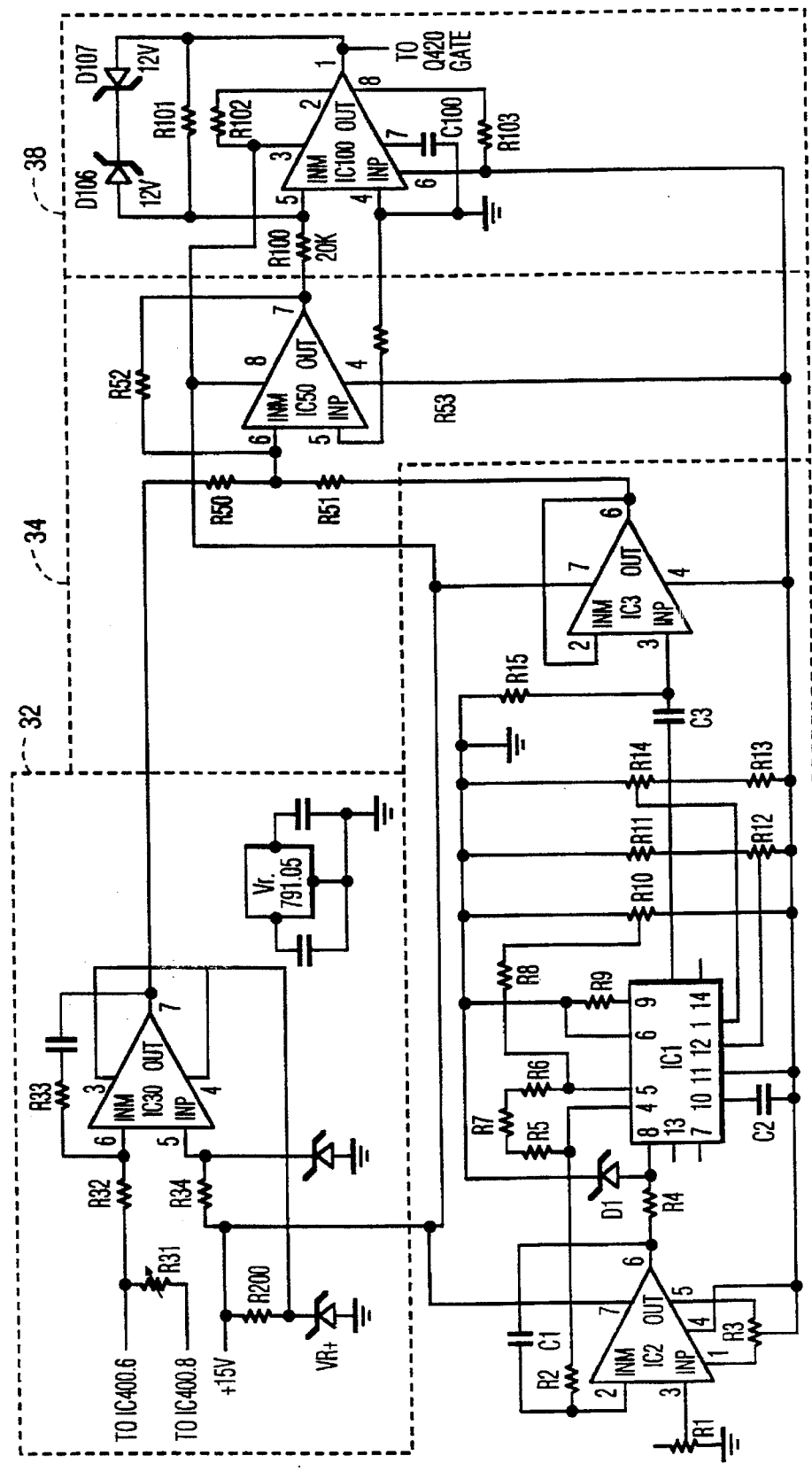
FIG. 4 is a practical implementation of the controller of FIG. 2.

FIG. 4 shows a practical embodiment of the controller of the subject invention. The circuit components shown in FIG. 4 are as follows:

| | |
|---|---|
| IC1 | ICL8038 - Harris |
| IC2, IC3 | LM741 |
| IC30 | LM358 |
| IC50 | LF353 |
| IC100 | BB3572 |
| R1 | 10 K ohms (variable) |
| R2, R4, R200 | 1 K ohms |
| R3, R9, R11, R13, R32 | 10 K ohms |
| R5, R6 | 4.7 K ohms |
| R7 | 500 K ohms |
| R8 | 1 M ohms |
| R10, R12, R14 | 100 K ohms (variable) |
| R15 | 100 K ohms |
| R31 | 5 K ohms (variable) |
| R33 | 82 K ohms |
| R34 | 48.7 K ohms |
| R50, R52 | 165 K ohms |
| R51, R100, R101 | 20 K ohms |
| R53 | 16.2 K ohms |
| R102, R103 | 4.5 W |
| C1 | 1 nf |
| C2 | 680 pf |
| C3 | 50 µf |
| C100 | 250 pf |
| C200 | 0.22 µf |
| C201 | 0.1 µf |
| D1, D20 | 6.2 V ZENER |
| D30 | 2 V ZENER |
| D100, D101 | 12 V ZENER |

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A controller for controlling a switched mode power supply for minimizing both conducted and radiated EMI emissions, said controller supplying a switching signal to said switched mode power supply having an input power switch for receiving said switching signal, characterized in that said controller comprises:

means for generating a sinusoidal-like wave as said switching signal; and means for selectively shifting a dc level in said sinusoidal-like wave, whereby a duty cycle of said sinusoidal-like wave at a predetermined threshold level, corresponding to a turn-on level of the power switch in said switched mode power supply, is effectively controlled, said sinusoidal-like wave and a resulting output signal from the input power switch of the switched mode power supply having low changes in current and voltage with respect to time, thereby minimizing EMI emissions.

2. A controller as claimed in claim 1, characterized in that said means for shifting a dc level in said sinusoidal-like wave comprises an error amplifier for generating a dc signal, and an adder coupled to receive said sinusoidal-like wave and said dc signal.

3. A controller as claimed in claim 2, characterized in that said error amplifier has a control input for receiving a control signal for controlling a level of said dc signal, and said switched mode power supply has an output for supplying said control signal for said error amplifier.

4. A controller as claimed in claim 2, characterized in that said controller further comprises a power amplifier coupled to an output of said adder, an output of said power amplifier forming an output of said controller.

5. A controller as claimed in claim 3, characterized in that said controller further comprises a power amplifier coupled to an output of said adder, an output of said power amplifier forming an output of said controller.

6. A method for reducing conducted and radiated EMI emissions in a switched mode power supply having an input power switch for receiving a switching signal, characterized in that said method comprises the steps:

generating a sinusoidal-like wave as said switching signal; and selectively shifting a dc level in said sinusoidal-like wave, whereby a duty cycle of said sinusoidal-like wave at a predetermined threshold level, corresponding to a turn-on level of the power switch in said switched mode power supply, is effectively controlled, said sinusoidal-like wave and a resulting output signal from the input power switch of the switched mode power supply having low changes in current and voltage with respect to time, thereby minimizing EMI emissions.

* * * * *